United States Patent
Heller et al.

(10) Patent No.: US 6,209,397 B1
(45) Date of Patent: Apr. 3, 2001

(54) PRESSURE SENSOR MEMBRANE HAVING STEPPED ANNULAR PERIPHERAL SURFACES AND PRESSURE SENSOR EMPLOYING SAME

(75) Inventors: Heinz Heller, Rippberg; Kurt Neubeck, Miltenberg; Robert Schwagerl, Klingenberg, all of (DE)

(73) Assignee: Wika Alexander Wiegand GmbH & Co., Klingenberg (DE)

( * ) Notice: Subject to any disclaimer, the term of this patent is extended or adjusted under 35 U.S.C. 154(b) by 0 days.

(21) Appl. No.: 08/991,586

(22) Filed: Dec. 15, 1997

(30) Foreign Application Priority Data

Dec. 18, 1996 (EP) .................................................. 96120380

(51) Int. Cl.$^7$ ..................................................... G01L 7/00
(52) U.S. Cl. ........................................................... 73/706
(58) Field of Search ............................ 73/706, 716, 718, 73/719, 720, 721, 722, 723, 724, 725, 726, 727, 756

(56) References Cited

U.S. PATENT DOCUMENTS

| 4,241,325 | 12/1980 | Giovanni . |
| 4,507,972 | 4/1985 | Morita . |
| 4,640,135 | * 2/1987 | Kästel et al. ............................ 73/716 |
| 5,094,109 | * 3/1992 | Dean et al. ............................. 73/718 |
| 5,230,248 | * 7/1993 | Cucci et al. ............................ 73/706 |
| 5,495,768 | * 3/1996 | Louwagie et al. ...................... 73/706 |
| 5,551,303 | * 9/1996 | Donner et al. ......................... 73/726 |

FOREIGN PATENT DOCUMENTS

| 60082827 | 5/1985 | (EP) . |
| 03225243 | 10/1991 | (EP) . |
| 0 465 573 B1 | 1/1992 | (EP) . |
| 04143630 | 5/1992 | (EP) . |
| 04168332 | 6/1992 | (EP) . |
| 0 517 631 A1 | 12/1992 | (EP) . |
| 08094474 | 4/1996 | (EP) . |

* cited by examiner

Primary Examiner—William Oen
(74) Attorney, Agent, or Firm—Roth & Goldman

(57) ABSTRACT

The invention concerns a membrane for a pressure sensor. The membrane has, on a flat central face (26), an annular attachment face (12), which is disposed concentric to the central face (26), and a non-flat connecting face (54), which links the central face (26) with the edge face (12). The connecting face (54) is formed from at least one annular step (36, 44, 52), which consists of one flat annular face (32, 40, 48) and one truncated-cone-shaped step face (30, 38, 46), which connects radially inward to the annular face. The annular faces (32, 40, 48) and the central face (26) lie in planes parallel to each other, whereby the heights (h1, h2, h3) of the step faces (30, 38, 46) measured perpendicular to the plane of the central face are very small in relationship to the width of the respective step. This stepped design of the membrane results in a high linearity of the characteristic of the membrane pressure sensor and at the same time to a steep slope of the characteristic in its linear region.

20 Claims, 1 Drawing Sheet

Figure 1:
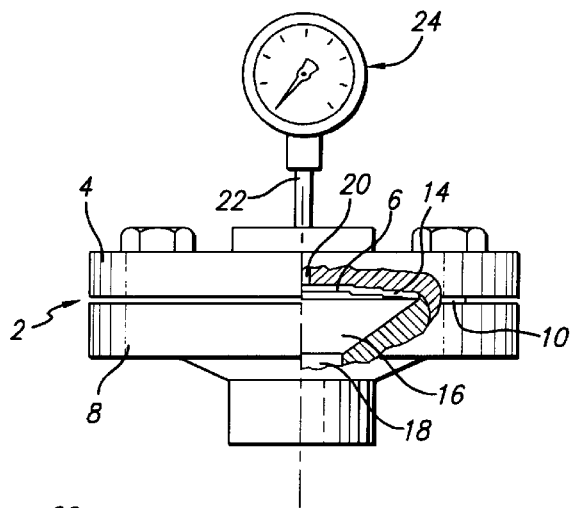

PRESSURE SENSOR MEMBRANE HAVING STEPPED ANNULAR PERIPHERAL SURFACES AND PRESSURE SENSOR EMPLOYING SAME

A membrane pressure sensor is used when a device responding to pressure should, for specific reasons, not come into contact with the substance to be measured. This may, for example, be the case when the substance to be measured is corrosive and would attack the instrument in the case of direct contact therewith, when the substance is highly viscous and thus the forwarding of the pressure in the dead spaces of the instrument would be hindered, or when the substance tends to crystallize or to polymerize and would thus clog connections with the instrument. This list of applications of a membrane pressure sensor is not complete and includes only a few possible examples.

The term device responding to pressure refers in the majority of applications to a pressure gage to measure and display the excess pressure of the substance to be measured. It may, however, also refer to a pressure transducer, a pressure switch, a pressure sensor, or a differential pressure measurement device or the like. In the following, the term pressure gage refers to an example of one of the possible devices responding to pressure, which is connected to the membrane pressure sensor and to which the pressure of the substance to be measured is transmitted by means of the membrane pressure sensor.

A prior art membrane pressure sensor has a base with a shallow recess, which is surrounded by an annular joining face. A usually round membrane, which has an annular attachment face, is attached to the annular fluid-leakproof joining face by soldering or by some other means. Thus, the walls of the recess and the membrane form the boundaries of a fluid chamber which is filled, during operation, with a suitable filling fluid. The fluid chamber is connected with the pressure gage via a line such that the pressure of the filling fluid in the fluid chamber is measured and possibly displayed by the pressure gage. On the side of the fluid chamber turned away from the membrane a measurement substance space, which is filled with the substance to be measured, is formed in the membrane pressure sensor, but is isolated from the fluid chamber by the membrane.

The pressure acting on the elastic membrane from the measurement substance space deflects the membrane. If the membrane pressure sensor were not solidly attached to the pressure gage, a volume of the fluid corresponding to the deflection of the membrane would escape from the fluid chamber. This volume of fluid is usually referred to as the working volume of the membrane pressure sensor.

The characteristic $\Delta v(p)$, which reflects the dependency of the working volume $\Delta v$ on the pressure p in the measurement substance space, is used to indicate the mode of operation of the membrane pressure sensor. It is required of this characteristic that it have, in the region of the pressure to be measured, the most uniform slope possible, i.e., run as linear as possible, such that the system-induced measurement error is kept as small as possible. When low pressures must be measured with high accuracy, i.e., in regions with low nominal pressure, the slope of the characteristic must be comparatively great in its linear region so a large working volume is associated with low pressures. The slope of the characteristic of a membrane pressure sensor in its linear region is usually referred to as its K-factor.

The curve of the characteristic of a membrane pressure sensor is determined essentially by its membrane. Although a flat membrane permits a characteristic with a steep slope at low pressures, it is not suitable for membrane pressure sensors since the characteristic is not linear.

This prior art membrane has on its edge an annular attachment face, in its center a flat central face, and a non-flat, annular connection face between the attachment face and the central face. It should be pointed out that the terminology conventional with flat membranes is used here, according to which the various regions or sections of a membrane are referred to as "faces", although the sections or regions of the membrane are bodies with a volume which does not equal zero. The name "faces" is justified since the thickness of the membranes, measured perpendicular to the plane of the membrane, is very small in comparison with the membrane dimensions in the plane of the membrane. In the prior art membrane, the connection face consists of annular concentric waves such that the connection face has a waved profile in its radial cross-section. This design as a so-called wave membrane permits high linearity of the characteristic, whereby it has been demonstrated that, to the extent that linearity has been improved by increasing the number and height of the waves, the hardness of the membrane is simultaneously increased and, accordingly, the K-factor or the slope of the characteristic is reduced.

The object of the invention is to improve the generic membrane such that it permits a characteristic with greater linearity and a greater slope, i.e., a higher K-factor. At the same time, a membrane pressure sensor with a correspondingly improved membrane is provided.

With the membrane according to the invention, provision is made that the connection face is formed by at least one annular step which consists of one flat annular face and one truncated-cone-shaped step face, which connects radially inward to the annular face, whereby the annular face and the central face lie in planes parallel to each other and whereby the height of each step face measured perpendicular to the plane of the central face is very small compared to the width of the step. Here, very small height means a height which is essentially in the range from 0.2% to 2.5% of the width of the step.

The truncated-cone-shaped design of the step faces does not rule out that the transition between the respective step faces and the flat faces adjacent thereto is rounded and that the truncated-cone shape is overlaid by a slight arch.

With the membrane according to the invention, the entire active face, i.e., the face enclosed by the attachment face, thus consists of flat faces disposed in various planes parallel to each other as well as one or a plurality of step faces of a very small height connecting the flat faces to each other. The diameter of the step face connecting to the central face becomes advantageously larger with an increasing distance from the plane of the central face. The same is true for the remaining step faces when more than one step is provided.

It has been demonstrated that the design of the membrane according to the invention yields a characteristic with greater linearity and also a steep slope in the linear region, i.e., a large K-factor. The design according to the invention permits a K-factor which is, for example, 10 times larger than that of an otherwise comparable wave membrane. Furthermore, the membrane according to the invention has a stable neutral position, because the at least one step causes stabilization, in contrast to the flat membrane.

The design of the membrane makes it possible that the fluid chamber of the membrane pressure sensor can be designed with a small volume such that the transmitting fluid volume enclosed in the fluid chamber is small. This in turn results in a reduction of temperature-induced measurement errors.

In an advantageous form of the membrane according to the invention, provision may be made that the number of annular steps is at least two and preferably at least three. Three steps have proved to be particularly advantageous.

When two or more annular steps are provided, the membrane is designed such that the distances between the planes of the central face and the planes of the annular faces are increasingly larger radially outward. It has also proved advantageous that the heights of the step faces be essentially equal.

In an advantageous form of the invention, provision may also be made that in each radial cross-section of the membrane the points on the circumference of the central face and the radially outward points of the circumference of all annular faces all lie on a circumscribing circle. It has been demonstrated that with such a design of the membrane, the area of the central face and of the annular faces are particularly favorably tuned to each other with respect to the desired combination of characteristics of high linearity and a high K-factor. It is preferred that the relationship R/H be in the range from 300 to 1200, in particular in the range from 600 to 1200, where R is the radius of the circumscribing circle and H the height of an arc of the circumscribing circle which is delimited by the radially outer points of the circumference of the radially outermost annular face.

In an advantageous form of the invention, provision may also be made that the central face, the attachment face, and the steps are in each case annular such that the membrane is a circular membrane. However, the invention is also applicable in non-circular membranes, for example, in oval membranes and rectangular membranes.

Figure 2:
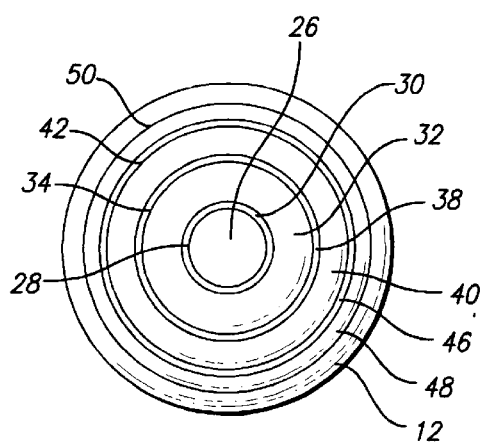
Figure 3:
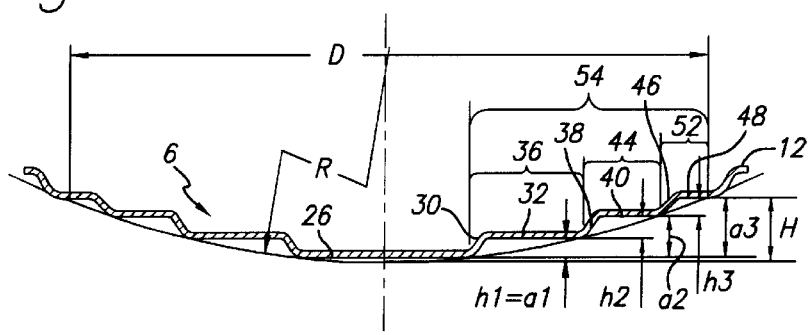

Additional characteristics and advantages of the membrane according to the invention are revealed in the following description of one exemplary embodiment thereof with reference to the drawing. The figures depict:

FIG. 1 a schematic side view, partially cut away, of a membrane pressure sensor according to the invention;

FIG. 2 a top view of an exemplary embodiment of the membrane according to the invention; and FIG. 3 a radial section through the membrane according to FIG. 2, enlarged.

A membrane pressure sensor 2 depicted schematically in FIG. 1 comprises an essentially circular disk-shaped base 4, a thin, stepped membrane 6 as well as an essentially circular disk-shaped flange 8. In the exemplary embodiment depicted, the thin, stepped membrane 6 is designed as a circular membrane with a circular outline.

On its side lying on the bottom in FIG. 1, the base 4 has a centrally disposed shallow recess which is surrounded by a raised annular flange section 10 protruding downward in FIG. 1. An annular attachment face 12 (see FIGS. 2 and 3) of the membrane 6 is sealingly soldered on the annular flange section 10. Thus, the walls of the recess and the membrane 6 form the boundaries of a shallow fluid chamber 14. The bottom of the shallow recess in the base 4 forms a membrane bed for the membrane 6, which, as FIG. 1 depicts, is also shaped in steps complementary to the membrane 6.

The flange 8 is solidly connected by means of bolts to the base 4 such that its top lies sealingly on the attachment face 12 of the membrane 6 and on the annular flange section 10. If appropriate, in this region, a sealing element may additionally be provided. In the center of the flange 8, a measurement substance space 16, which is isolated from the fluid chamber by the membrane 6, is formed. Through a bore 18 in the flange 8, the measurement substance space 16 can be connected to the system which guides the measurement substance whose pressure is to be measured.

The fluid chamber 14 is connected via a central bore 20 with a line 22, onto which is connected in turn a pressure gage 24 (depicted in reduced scale), for example, a bourdon tube pressure gage.

In operation, the fluid chamber 14, the bore 20, the line 22, and the measuring element of the pressure gage 28 are filled with a suitable filling fluid. In addition, in operation, the measurement substance space 16 is filled with the measurement substance whose pressure is to be measured. The pressure of the measurement substance in the measurement substance space 16 is transmitted by means of the membrane 6 to the filling fluid in the fluid chamber 14, such that the pressure gage 24, which measures and displays the pressure of the filling fluid, thus simultaneously measures and displays the pressure of the measurement substance in the measurement substance space 16.

The membrane 6 of the above-described membrane pressure sensor 2 is explained in greater detail in the following with reference to FIGS. 2 and 3. FIG. 2 depicts a view of the membrane 6 from the bottom in FIG. 1, whereas FIG. 3 depicts a section through the membrane 6 in a radial plane thereof In FIG. 3, the membrane 6 is depicted in a reversed position relative to the installation position according to FIG. 1. Accordingly, the upper side of the membrane in FIG. 3 faces the measurement substance space 16 and the lower side of the membrane in FIG. 3 faces the fluid chamber 14 when the membrane 6 is installed in the membrane pressure sensor.

FIG. 3 depicts the membrane greatly magnified: All vertical dimensions are depicted substantially larger in comparison to the horizontal dimensions of the membrane 6 than is true in reality. This is also true for the thickness of the membrane 6. FIG. 3 is an enlarged depiction exaggerated in the vertical direction of a membrane with a thickness of 0.1 mm and a diameter D of the active face impacted by pressure bounded by the attachment face 12 of 82 mm.

The membrane 6 is usually made from a special material adapted to the applicational purpose of the membrane pressure sensor 2, for example, titanium, Hastelloy (nickel-molybdenum-iron alloy with over 55% nickel), Monel (nickel-copper alloy with 30 to 40% copper), Inconel (heat-resistant nickel based alloy) or tantalum. The form depicted in FIGS. 2 and 3 obtains the membrane by stamping a flat, circular blank. The shaping process is not essential to the invention and is thus not explained in greater detail here.

The membrane 6 is formed rotationally symmetric around its center line depicted as a dotted line in FIG. 3.

As depicted in FIGS. 2 and 3, the membrane 6 comprises a flat, circular central face 26, whose circumferential points lie in a circle 28. Radially outward, a first truncated-cone-shaped step face 30 connects to the central face 26, to which step face 30 connects radially outward in turn a first flat annular face 32, whose radially outer circumferential points lie in a circle 34. The first step face 30 and the first annular face 32 form together a first annular step 36. Radially outward, a second truncated-cone-shaped step face 38 connects to the first annular face 32, which transitions radially outward in turn into a second flat annular face 40, whose radially outer circumferential points lie in a circle 42. The second step face 38 and the second annular face 40 form together a second step 44. Radially outward, a third truncated-cone-shaped step face 46 connects to the second annular face 40, which transitions radially outward into a third flat annular face 48, whose radially outer circumferential points lie in a circle 50. The third step face 46 and the third annular face 48 form together a third step 52. The attachment face 12, which, in the exemplary embodiment depicted, has a stamped edge with an S profile, but could also be designed flat, connects to the third annular face 48.

The transitions between the truncated-cone-shaped step faces 30, 38, and 46 and the respective adjacent flat faces are rounded. The diameter of each of the truncated-cone-shaped step faces 30, 38, and 46 increases with the increasing distance from the plane of the central face 26, such that each of the truncated-cone-shaped step faces has its greatest diameter at the transition to the annular face with which it forms one of the steps.

Based on the above-described design of the membrane 6, the distance a1 between the plane of the central face 26 and the plane of the first annular face 32 is smaller than the distance a2 between the plane of the central face 26 and the plane of the second annular face 40, whereby the distance a2 in turn is smaller that the distance a3 between the plane of the central face 26 and the plane of the third annular face 48. This means that the distances between the planes of the central face 26 and the planes of the annular faces 32, 40, and 48 are increasingly larger radially outward.

The three steps 36, 44, and 52 form together an annular connecting face 54, which connects the central face 26 with the annular attachment face 12. The pressure impacted face of the membrane 6, i.e., its working face, is composed of the central face 26 and the three steps 36, 44, and 52 and is thus delimited radially outward by the circle 50, which has the diameter D (see FIG. 3).

The first step face 30 has, measured perpendicular to the plane of the central face 26, a height h1, which is equal to the distance a1. The second step face 38 has a height h2, and the third step face 46 has a height h3. These heights are all together very small in relationship to the width of the respective step 36, 44, or 52, whereby the width of a step is the difference between the radii of the circles bounding the respective step radially inward and radially outward. In the exemplary embodiment depicted, the heights h1, h2, and h3 are equal to each other. The height h1 is 1.43% of the width of the first step 36; the height h2 is 1.5% of the width of the second step 44; and the height h3 is 1.94% of the width of the third step 52.

In each radial section of the membrane 6 according to the exemplary embodiment depicted and thus also in the radial section depicted in FIG. 3, the circumferential points of the central face 26 and the radially outward circumferential points of all annular faces 32, 40, and 48 all lie on a common circumscribing circle with the radius R. The radius R is very large in relationship to the height of the section of the circumscribing circle which is bounded by the radially outward circumferential points of the radially outermost annular face, i.e., the third annular face 48. In the exemplary embodiment depicted, the relationship R/H is 1000 and falls within the preferred range for the relationship R/H of from 300 to 1200. Since the membrane 6 is designed rotationally symmetric around its center line, the circumscribing circles in each radial segment have the same radius R. Accordingly, the circle 28 bounding the central face 26 and the circles 34, 42, and 50 radially outwardly bounding the annular faces all lie on a sphere with the radius R of the circumscribing circle equal in all radial segments.

The faces of the membrane projected on the plane of the central face 26 have in the projection plane, i.e., in the plane of the central face, in the exemplary embodiment described, the following percentage area. The area of the central face 26 is 10% of the area of the active face of the membrane. The area of the first step face 30 is 5% of the area of the active face of the membrane. The area of the first annular face 32 is 13% of the area of the active face. The area of the second step face 38 is 7% of the area of the active face. The area of the second annular face 40 is 17% of the area of the active face. The area of the third step face 46 is 10% of the area of the active face, and the area of the third annular face 48 is 22% of the area of the active face. The area of the attachment face 12 is 16% of the area of the active face. Of course, the invention is not restricted to the concrete details of the exemplary embodiment described above with reference to the FIGS. 2 and 3.

The invention concerns a membrane for a pressure sensor. The membrane has, on a flat central face, an annular attachment face, which is disposed concentric to the central face, and a non-flat connecting face which links the central face with the edge face. The connecting face is formed from at least one annular step, which consists of one flat annular face and one truncated-cone-shaped step face, which connects radially inward to the annular face. The annular faces and the central face lie in planes parallel to each other, whereby the heights of the step faces measured perpendicular to the plane of the central face are very small in relationship to the width of the respective step. This stepped design of the membrane results in a higher linearity of the characteristic of the membrane pressure sensor and at the same time in a greater slope of the characteristic in its linear region.

What is claimed is:

1. A membrane for a pressure sensor, said membrane comprising a flat central face, an annular attachment face concentric with the central face, said annular attachment face forming a radially outer edge of the membrane, and an annular connecting face, between and connecting the central face and the attachment face, said faces not all being coplanar, said connecting face being formed from at least one annular step comprising one flat annular face and one truncated-cone-shaped step face radially inward of the annular face whereby said flat annular face and the central face lie in parallel planes, and whereby each step face has a height measured perpendicular to the plane of the central face which is very small in relationship to the width of the step.

2. The membrane according to claim 1, characterized in that the number of annular steps is at least two.

3. The membrane according to claim 1, characterized in that the number of annular steps is at least three.

4. The membrane according to claim 2 or 3, characterized in that the distances between the plane of the central face and the planes of the annular faces increase with increasing radial distance from said central face.

5. The membrane according to claim 4, characterized in that the heights of the step faces are essentially equal.

6. The membrane according to claim 2, characterized in that in each radial section of the membrane, the circumferential points of the central face and the radially outward circumferential points of the of all annular faces all lie on a circumscribing circle.

7. The membrane according to claim 6, characterized in that the relationship R/H is within the range of 300 through 1200, wherein R is the radius of the circumscribing circle and H the height of a segment of the circumscribing circle, which is bounded by the radially outward points of the radially outermost flat annular face.

8. The membrane according to claim 7, characterized in that the relationship R/H is within the range of 600 through 1000.

9. The membrane according to claim 1, characterized in that the central face, the attachment face and the steps are each annular.

10. The membrane according to claim 9, characterized in that the attachment face is flat.

11. The membrane according to claim 9, characterized in that the attachment face has a stamped edge.

12. A membrane pressure sensor comprising: a base and a thin membrane attached to the base together with the walls of the recess, a fluid chamber to define a sealed fluid chamber on one side of said membrane which in operation is filled with a filling fluid and a measurement chamber on the other side of said membrane to be filled in operation with a substance whose pressure is to be measured, said membrane having a flat central face, an annular attachment face concentric with the central face, said annular attachment face forming a radially outer edge of the membrane, and an annular connecting face between and interconnecting the central face and the attachment face, the connecting face being formed from at least one annular step comprising one flat annular face and one truncated-cone-shaped step face radially inward of the annular face, whereby said flat annular face and the central face lie in parallel planes, and whereby the height of each step face measured perpendicular to the plane of the central face is very small relative to the width of the step.

13. The sensor according to claim 12, characterized in that the number of annular steps is at least two.

14. The sensor according to claim 12, characterized in that the number of annular steps is at least three.

15. The sensor according to claim 13 or 14, characterized in that the distances between the plane of the central face and the planes of the annular faces increase with increasing radial distance of said annular faces from said central face.

16. The sensor according to claim 15, characterized in that the heights of the step faces are essentially equal.

17. The sensor according to claim 13, characterized in that in each radial section of the membrane, the circumferential points of the central face and the radially outward circumferential points of the annular faces all lie on a circumscribing circle.

18. The sensor according to claim 17, characterized in that the relationship R/H is within the range of 300 through 1200, wherein R is the radius of the circumscribing circle and H the height of a segment of the circumscribing circle, which is bounded by the radially outward points of the radially outermost flat annular face.

19. The sensor according to claim 18, characterized in that the relationship R/H is within the range of 600 through 1000.

20. The sensor according to claim 12, characterized in that the central face, the attachment face and the steps are each annular.

* * * * *